United States Patent
Cirtwill et al.

(10) Patent No.: US 11,639,687 B2
(45) Date of Patent: May 2, 2023

(54) FUEL INJECTORS AND METHOD OF PURGING FUEL INJECTORS

(71) Applicant: PRATT & WHITNEY CANADA CORP., Longueuil (CA)

(72) Inventors: Joseph Cirtwill, Gravenhurst (CA); Jian-Ming Zhou, Mississauga (CA); Kian McCaldon, Orangeville (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 58 days.

(21) Appl. No.: 17/077,954

(22) Filed: Oct. 22, 2020

(65) Prior Publication Data

US 2022/0128008 A1    Apr. 28, 2022

(51) Int. Cl.
    *F02C 7/30*      (2006.01)
    *F02C 7/232*      (2006.01)

(52) U.S. Cl.
    CPC ............... *F02C 7/30* (2013.01); *F02C 7/232* (2013.01); *F23R 2900/00004* (2013.01)

(58) Field of Classification Search
    CPC .. F02C 7/30; F02C 7/232; F02C 7/222; F23R 2900/00004
    See application file for complete search history.

(56) References Cited

U.S. PATENT DOCUMENTS

| | | | |
|---|---|---|---|
| 5,243,816 A | 9/1993 | Huddas | |
| 5,881,550 A | 3/1999 | Toelle | |
| 6,729,135 B1* | 5/2004 | Norris | F02C 3/24 60/657 |
| 2011/0036092 A1* | 2/2011 | Lawson | F23R 3/36 60/734 |
| 2013/0118178 A1* | 5/2013 | Sabelhaus | F02C 7/232 60/39.463 |
| 2017/0159938 A1 | 6/2017 | Barnhart | |
| 2020/0033006 A1* | 1/2020 | Miyamoto | F02C 7/222 |

OTHER PUBLICATIONS

European Search Report issued in counterpart application 21204047.1 dated Mar. 18, 2022.

* cited by examiner

*Primary Examiner* — Katheryn A Malatek
(74) *Attorney, Agent, or Firm* — Norton Rose Fulbright Canada LLP

(57) ABSTRACT

A method of purging fuel injectors of a gas turbine engine, the fuel injectors fluidly connected to a fuel manifold and having primary and secondary fuel passages fluidly connectable to the fuel manifold, the method includes: selectively fluidly disconnecting one or more of the primary and secondary fuel passages from the fuel manifold; and purging the one or more of the primary and secondary fuel passages by injecting a purging fluid into the one or more of the primary and secondary fuel passages while bypassing the fuel manifold. A fuel injector having two fuel passages, a flow divider valve, and a purging valve is disclosed.

12 Claims, 3 Drawing Sheets

FUEL INJECTORS AND METHOD OF PURGING FUEL INJECTORS

TECHNICAL FIELD

The application relates generally to gas turbine engines and, more particularly, to fuel systems of such engines.

BACKGROUND OF THE ART

A gas turbine engine has a fuel system including a fuel manifold for distributing fuel amongst a plurality of fuel injectors distributed around a combustor of the gas turbine engine. In some cases, it is required to purge the fuel manifold to empty it from the fuel it contains. For instance, it may be required to purge the fuel manifold before shutting down the engine. In some cases, the purging of the fuel manifold is done to avoid fuel residue from burning on nozzles of the fuel injectors. This phenomenon is known as "coking" and is undesired since it may impair durability of the fuel injectors.

SUMMARY

In one aspect, there is provided a method of purging fuel injectors of a gas turbine engine, the fuel injectors fluidly connected to a fuel manifold and having primary and secondary fuel passages fluidly connectable to the fuel manifold, the method comprising: selectively fluidly disconnecting one or more of the primary and secondary fuel passages from the fuel manifold; and purging the one or more of the primary and secondary fuel passages by injecting a purging fluid into the one or more of the primary and secondary fuel passages while bypassing the fuel manifold.

In some embodiments, the selectively fluid disconnecting the one or more of the primary and secondary fuel passages from the fuel manifold includes moving flow divider valves of the fuel injectors from a first position in which the fuel manifold is fluidly connected to both of the primary and secondary fuel passages to a second position in which the fuel manifold is disconnected from the one or more of the primary and secondary fuel passages.

In some embodiments, the purging of the one or more of the primary and secondary fuel passages includes flowing the purging fluid into the one or more of the primary and secondary fuel passages downstream of the flow divider valves.

In some embodiments, the purging of the one or more of the primary and secondary fuel passages includes moving purging valves of the fuel injectors from a first purging valve position in which fluid communication between a source of the purging fluid and the one or more of the primary and secondary fuel passages is limited to a second purging valve position in which the source of the purging fluid is fluidly connected to the one or more of the primary and secondary fuel passages.

In some embodiments, the moving of the purging valves includes moving the purging valves from the first purging valve position to the second purging valve position when a fuel pressure into the one or more of the primary and secondary fuel passages becomes less than a threshold pressure.

In some embodiments, the purging valves are electro-mechanical valves, the moving of the purging valves includes powering the electro-mechanical valves to move the purging valves from the first purging valve position to the second purging valve position.

In some embodiments, the purging of the one or more of the primary and secondary fuel passages includes purging both of the primary and secondary fuel passages.

In some embodiments, the injecting of the purging fluid includes injecting compressed air.

In some embodiments, the injecting of the compressed air includes drawing air from a compressor section of the gas turbine engine and injecting the drawn compressed air to the fuel injectors.

In some embodiments, the injecting of the compressed air includes injecting the compressed air from a pressurized reservoir.

In some embodiments, the injecting of the purging fluid includes flowing the purging fluid into a purging fluid manifold extending around a central axis of the gas turbine engine and injecting the purging fluid from the purging fluid manifold to the fuel injectors.

In some embodiments, the injecting of the purging fluid includes fluidly connecting independently each of the fuel injectors to the source of the purging fluid via respective fluid lines.

In another aspect, there is provided a fuel injector for a gas turbine engine, comprising: a body defining a fuel inlet fluidly connectable to a fuel manifold of the gas turbine engine, a primary fuel passage leading to a first fuel outlet, a secondary fuel passage leading to a second fuel outlet, and a purging fluid inlet distinct from the fuel inlet and fluidly connected to one or more of the primary and secondary fuel passages; a flow divider valve having a valve inlet fluidly connected to the fuel inlet, a first valve outlet fluidly connected to the first fuel outlet via the primary fuel passage, and a second valve outlet fluidly connected to the second fuel outlet via the secondary fuel passage, the flow divider valve operable to divide fuel from the fuel inlet between the first fuel outlet and the second fuel outlet; and a purging valve having a purging valve outlet fluidly connected to the purging fluid inlet and a purging valve inlet fluidly connectable to a source of a purging fluid, the purging valve having a first position in which the purging valve inlet is disconnected from the purging fluid inlet, and a second position in which the purging valve inlet is fluidly connected to purging fluid inlet, the flow divider valve having a first purging position in which fluid communication between the fuel inlet and the one or more of the primary and secondary fuel passages is limited while the purging valve is in the second position.

In some embodiments, the purging fluid inlet is fluidly connected to the one or more of the primary and secondary fuel passages downstream of the flow divider valve.

In some embodiments, the purging fluid inlet is fluidly connectable to both of the primary fuel passage and the secondary fuel passage, the purging valve having a third position in which the purging valve inlet is fluidly connected to both of the primary fuel passage and the secondary fuel passage, the flow divider valve having a second purging position in which fluid communication between the fuel inlet and both of the primary and secondary fuel passages is limited while the purging valve is in the third position.

In some embodiments, the purging valve moves from the first position to the second position when a fuel pressure in the one or more of the primary and secondary fuel passages becomes less than a threshold pressure.

In some embodiments, the purging valve is an electro-mechanical valve operable to move the purging valve between the first position and the second position.

In yet another embodiment, there is provided a gas turbine engine, comprising: a fuel manifold circumferentially extending around a central axis; fuel injectors distributed around the central axis, the fuel injectors having fuel inlets fluidly connected to the fuel manifold, first fuel outlets, and second fuel outlets, the first fuel outlets and the second fuel outlets communicating with a combustor of the gas turbine engine, primary fuel passages leading to the first fuel outlets, secondary fuel passages leading to the second fuel outlets, flow divider valves fluidly connected to the fuel inlet, the first fuel outlets, and the second fuel outlets, the flow divider valve operable to divide fuel received at the fuel inlets between the first fuel outlets and the second fuel outlets, purging fluid inlets fluidly connected to one or more of the primary and secondary fuel passages independently of the fuel manifold, and purging valves fluidly connected to the purging fluid inlets, the purging valves operable to selectively allow fluid communication between a source of a purging fluid and the purging fluid inlets.

In some embodiments, the gas turbine engine comprises a purging fluid manifold having a manifold inlet fluidly connected to the source of the purging fluid and manifold outlets, each of the manifold outlets fluidly connected to a respective one of the purging valves of the fuel injectors, or a plurality of fluid lines each independently fluidly connecting the source of the purging fluid to the purging valves.

In some embodiments, the purging valves are pressure-based valve fluidly connecting the source of the purging fluid to the one or more of the primary and secondary fuel passages when a fuel pressure into the one or more of the primary and secondary fuel passages becomes less than a threshold pressure, or the purging valves are electromechanical valves.

DESCRIPTION OF THE DRAWINGS

Reference is now made to the accompanying figures in which.

DETAILED DESCRIPTION

Figure 1:
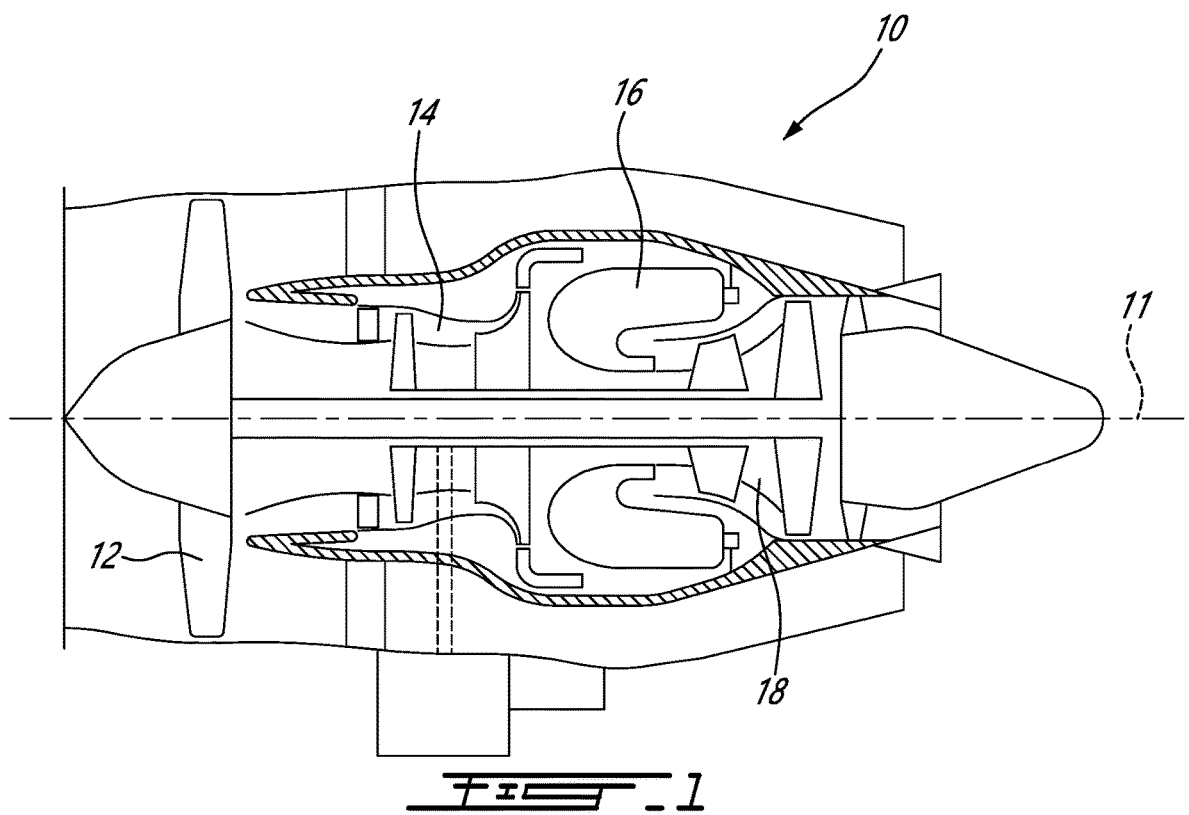
FIG. 1 is a schematic cross sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, compressor section 14, combustor 16, and turbine section 18 are preferably all concentric about a common central longitudinal axis 11 of the gas turbine engine 10.

Figure 2:
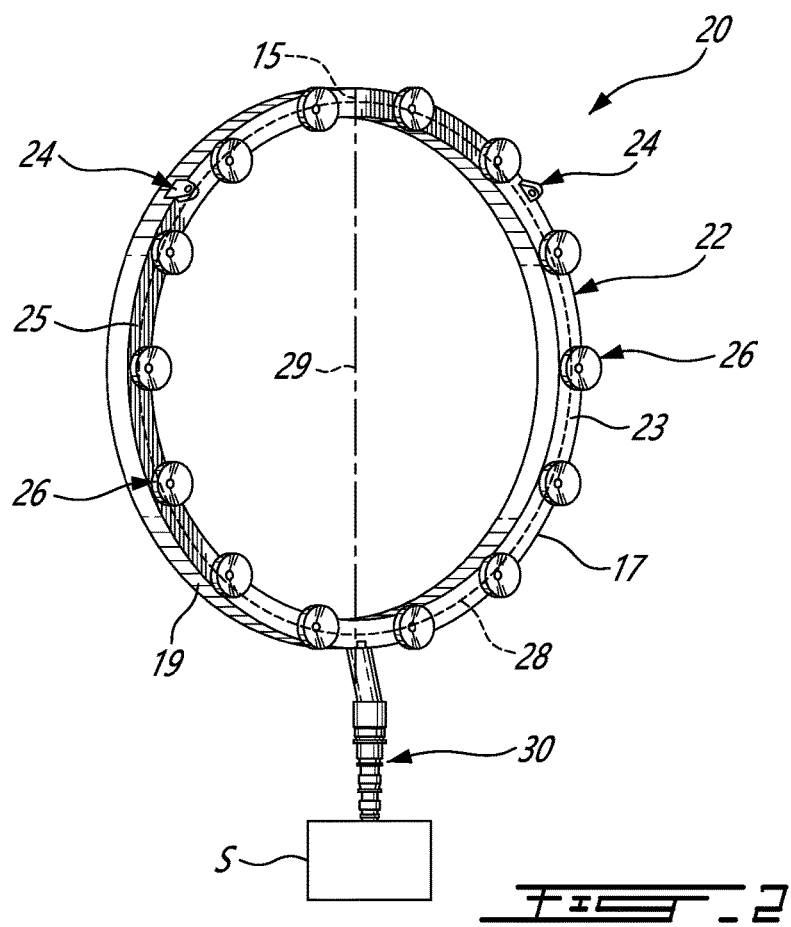
FIG. 2 is a three dimensional view of a fuel manifold in accordance with one embodiment for the gas turbine engine of FIG. 1.

Referring to FIGS. 1-2, fuel is injected into the combustor 16 of the gas turbine engine 10 by a fuel system 20 which includes a fuel source S and at least one fuel conveying member which is operable to inject fuel into the combustor 16 for mixing with the compressed air from the compressor section 14 and ignition of the resultant mixture. The fuel system 20 includes fuel manifold 22 used for distributing the fuel circumferentially around the central axis 11 of the engine 10 and to divide the fuel into the plurality of fuel injectors 26.

The fuel manifold 22 is mounted in place adjacent to the combustor 16 via suitable mounting elements, which may in one possible embodiment include several integral attachment lugs 24. It is contemplated that the fuel manifold 22 could be mounted to a support structure surrounding the combustor 16. For example, the fuel manifold 22 could be mounted to the engine case. It is also contemplated that the fuel manifold 22 could be mounted by ways other than the attachment lugs 24. For example, using fasteners, welds, or the like, which engage the fuel manifold in place to one or more of the combustor, the surrounding gas generator casing, etc.

In the depicted embodiment, the fuel manifold 22 has a ring-shaped body 23. It is contemplated that the fuel manifold 22 could have shapes other than a ring. For example, the fuel manifold 22 could be a half ring or another arcuate shape. The body 23 may be covered by an outer heat shield which may provide the fuel manifold 22 thermal protection from the high temperature environment of the combustor 16. It is contemplated that the outer heat shield could be omitted. The fuel manifold 22 is symmetric with respect to an axis 29. For purposes of orientation, the axis 29 in this specification will be defined as a vertical axis. The vertical axis 29 defines two portions of the fuel manifold 22, namely a right side 17 and a left side 19 or orientation purposes, a bottom of the manifold ring 22 is defined herein to be at a location of the inlet 30 on the fuel manifold 22, and a top 15 is defined herein to be a location of the fuel manifold 22 opposite to the inlet 30 along the vertical axis 29, and which corresponds to a highest point of the fuel manifold 22. The top 15 and bottom thereby define upward and downward orientations for purposes of orientation in this specification.

As shown in FIG. 2, the fuel manifold 22 is connected to a plurality of fuel nozzles 26. In the embodiment shown, the plurality of fuel nozzles 26 (fourteen in the embodiment shown in FIG. 2) is provided on a front face 25 of the ring-shaped body 23. The fuel nozzles 26 may be part of fuel injectors described, for example, in U.S. Pat. No. 6,082,113, the entire contents of which are incorporated herein by reference. It is contemplated that the fuel manifold 22 could have more or less than fuel nozzles 26. It is also contemplated that the injectors could span only a portion of the circumference 28 of fuel manifold 22. It will be appreciated that the manifold may have other shapes. For instance, the manifold may comprise a collection of nozzles and transfer tubes that form a ring, or flexible/rigid piping that connects the nozzles and manifold inlet into a manifold.

In some situations, it may be required to purge the fuel manifold 22 and the fuel injectors 26 from the fuel they contain. For instance, regulations may require that all the fuel contained in the manifold 22 be burned before the engine 10 is shut down. This may ensure that no fuel leaks out of the engine and pollute the environment. Two methods are commonly used to purge the fuel: reverse and forward purging. In reverse purging, the fuel is pushed back inside the manifold and the manifold is drained in a dedicated receptacle. In forward purging, the fuel is pushed out of the manifold via the injectors and into the combustion chamber 16. In forward purging, the fuel is burned while the engine is shutting down.

Moreover, some gas turbine engines have more than one manifold each fluidly connected to a respective one of nozzle outlets of fuel injectors. For instance, the fuel injectors may have primary nozzle outlets, secondary nozzle outlets, and in some cases tertiary nozzle outlets. Some of those outlets are used for lighting the engine and are not used afterwards. Therefore, after the engine is powered on, some of the nozzles outlets are no longer needed and must be purged to avoid a phenomenon known as "nozzle coking". Nozzle coking is a phenomenon in which fuel that remains around the nozzle outlets gets burned by the high temperature inside the combustion chamber 16 and "cooks" on the nozzle and forms a layer of carbon, which is undesired and which may impair performance of the nozzle. To limit nozzle coking, the fuel manifold(s) that is/are fluidly connected to the nozzle outlets that are no longer needed is/are purged.

To carry the forward purging method, a pressurized fluid is injected to blow the fuel out of the manifold. However, a substantial amount of air is required to do so. In the present disclosure, only the fuel contained in the fuel injector is purged, leaving the manifold full with fuel. Such a manifold is referred to as a "wet" manifold. The manifold may remain full of fuel even after the engine is shut down. As it will be explained below, the fuel injectors are able to limit the fuel from flowing from the manifold to the combustion chamber 16. This may allow the fuel to be kept into the manifold. Hence, only a small amount of a pressurized fluid may be used to purge the fuel injector from fuel.

Figure 3:
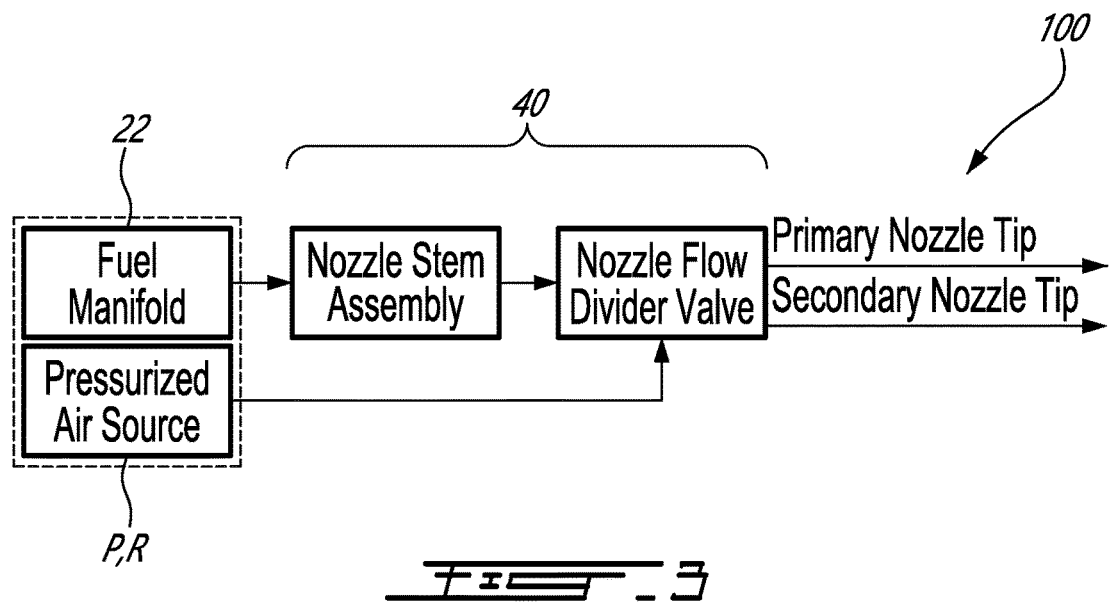
FIG. 3 is a schematic view of a purging system in accordance with one embodiment used for purging fuel from fuel injectors fluidly connected to the manifold of FIG. 2.

Referring to FIG. 3, a purging system in accordance with one embodiment is shown at 100. The purging system 100 includes a source P of pressurized fluid, such as air, that is fluidly connected to fuel injectors 40 of the fuel system 20. As illustrated, the purging fluid is injected directly at the fuel injectors 40 while bypassing the fuel manifold 22. As will be explained below, this may allow to purge solely the injectors 40 without having to purge the whole manifold 22.

The source of the purging fluid P may be the compressor section 16 of the engine 10. For instance, the compressor section 16 may have a bleed outlet fluidly connected to the fuel injectors 40. The bleed outlet may be used to pressurize a container. In some cases, another engine may be bled to provide the compressed air required for purging. In some operating conditions, the pressure drop between the compressor section and the combustor may be too small to use compressor air at the same operating condition. The air may have to be gathered at a high pressure condition (e.g. take-off) and used as the purge gas when the combustion chamber has at a relatively lower pressure where the purging is required. Alternately, pressurized air can be used from another engine that is running at a higher power. Alternatively, the source of the purging fluid P may be a pressurized reservoir R. The purging fluid may be air, or any other suitable fluid. It will be appreciated that the purging fluid may be, for instance, nitrogen or any other suitable fluid, such as any other suitable relatively inert gas.

Figure 4:
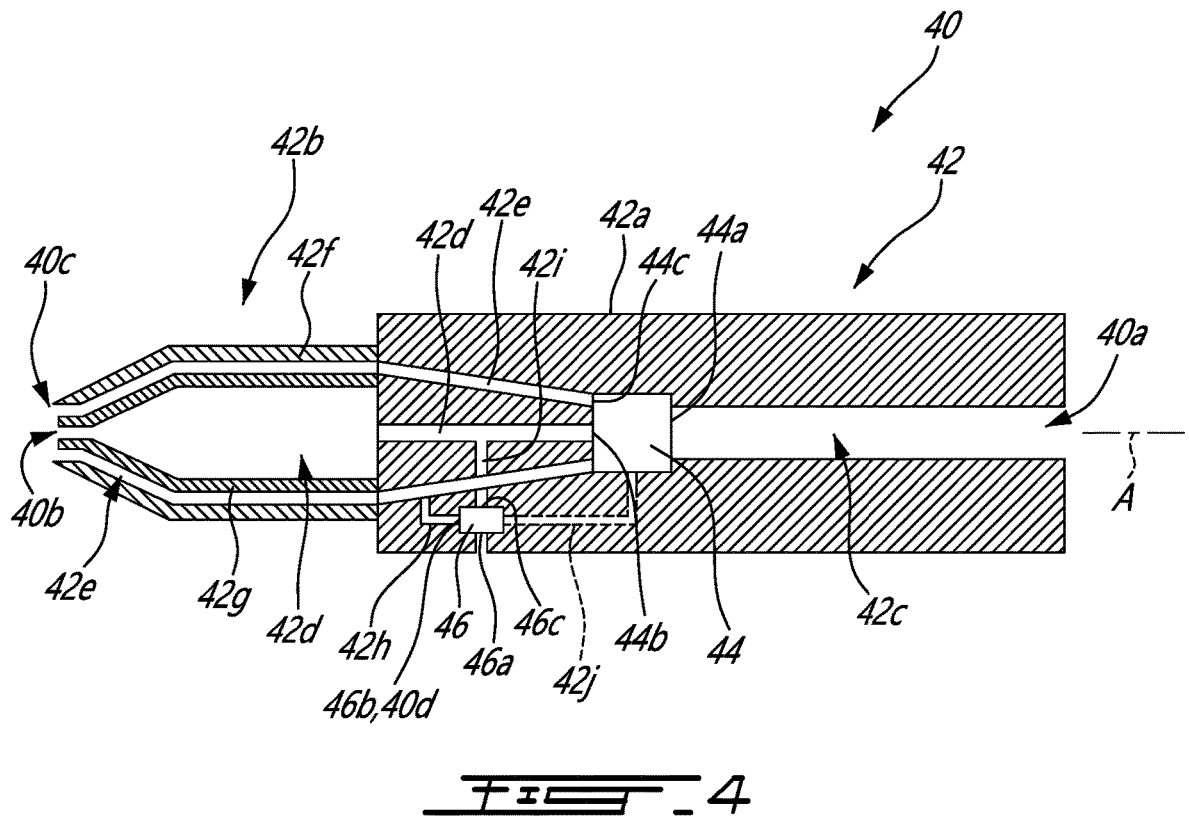
FIG. 4 is a schematic cross-sectional view of a fuel injector in accordance with one embodiment that may be used with the fuel manifold of FIG. 2.

Referring to FIG. 4, one of the fuel injectors is shown at 40. The injector 40 has an inlet 40a, a first outlet 40b, and a second outlet 40c. In the embodiment shown, the second outlet 40c is annular and extends circumferentially around the first outlet 40b relative to a central axis A of the injector 40. The injector 40 has a body 42 that has a main portion 42a and a nozzle portion 42b axially protruding from the main portion 42 relative to the central axis A. The inlet 40a is defined by the main portion 42a of the body 42 whereas the first outlet and the second outlet 40b, 40c are defined by the nozzle portion 42b of the body 42.

The injector 40 includes a flow divider valve 44 located within the main portion 42a of the body 42. The flow divider valve 44 has an inlet 44a fluidly connected to the inlet 40a of the fuel injector 40 via a fuel passage 42c defined within the main portion 42a of the body 42. The flow divider valve 44 has a first outlet 44b and a second outlet 44c. The first outlet 44b of the flow divider valve 44 communicates with the first outlet 40b of the injector 40 via a primary fuel passage 42d. The second outlet 44c of the flow divider valve 44 communicates with the second outlet 40c of the injector 40 via a secondary fuel passage 42e which may be annularly extending around the central axis A. As illustrated in FIG. 4, the primary fuel passage 42d and the secondary fuel passage 42e of the body 42 of the fuel injector 40 extend in both of the main portion 42a and the nozzle portion 42b of the body 42. Each of the primary and secondary fuel passages 42d, 42e of the body 42 leads to a respective one of the first outlet 40b and the second outlet 40c. The flow divider valve 44 is operable to divide a flow of fuel received from the inlet 40a of the fuel injector 40 into two sub-flows of fuel each exiting the flow divider valve 44 via a respective one of the first outlet 44b and the second outlet 44c. In the present embodiment, the flow divider valve 44 is responsible for modulating the fuel flow (i.e. pressure drop) between the primary and secondary fuel outlets 40b, 40c.

Particularly, the flow divider valve 44 has a first position in which the fuel inlet 40a is fluidly connected to both of the first fuel outlet 40b and the second fuel outlet 40c via the flow divider valve 44, a second position in which the fuel inlet 40a is fluidly connected to the first fuel outlet 40b via the flow divider valve 44 and in which the flow divider valve 44 limits fluid communication between the second fuel outlet 40c and the fuel inlet 40a, and a third position in which the flow divider valve 44 limits fluid communication between the fuel inlet 40a and both of the first fuel outlet 40b and the second fuel outlet 40c. It will be appreciated that, in an alternate embodiment, in the second position of the flow divider valve 44, the fuel inlet 40a is fluidly connected to the second fuel outlet 40c and disconnected from the first fuel outlet 40b.

In the depicted embodiment, the nozzle portion 42b of the body 42 of the injector 40 has two concentric walls, namely an outer annular wall 42f and an inner annular wall 42g located radially inwardly of the outer annular wall 42f relative to the central axis A. Each of the two concentric walls 42f, 42g protrudes from the main portion 42a of the body 42 and each extends circumferentially around the central axis A of the injector 40. A portion of the primary passage 42d is located radially inwardly of the inner annular wall 42g. A portion of the secondary passage 42e is located radially between the inner annular wall 42g and the outer annular wall 42f relative to the central axis A. Other configurations are contemplated without departing from the scope of the present disclosure. For instance, the second outlet 40c of the injector 40 may be provided in the form of a plurality of apertures circumferentially distributed about the central axis A of the injector 40.

In some cases, it may be required to purge the secondary passage 42e, for instance, when the engine 10 is operated in a low-power mode. The injector 40 has a purging valve 46 having an inlet 46a fluidly connected to the source of the purging fluid P. The purging valve 46 has an outlet 46b fluidly connected to a second inlet 40d of the injector 40. The second inlet 40d is fluidly connected to the secondary passage 42e, which fluidly connects the flow divider valve 44 to the second outlet 40c of the injector 40. The second inlet 40d of the injector 40 is distinct from the fuel inlet 40a and is independent from the fuel manifold 22 (FIG. 2). In the embodiment shown, the main portion 42a of the body 42 defines a first purging fluid passage 42h that fluidly connects the first outlet 46b of the purging valve 46 to the secondary passage 42e. It will be appreciated that, alternatively, the purging valve 46 may be located outside the body 42 of the injector 40. That is, the second inlet 40d of the injector 40 may be connected to a fluid line; the purging valve 46 being fluidly connected on the fluid line.

In some cases, such as when the engine is shutting shown, it may be required to purge both of the primary and secondary passages 42d, 42e. A second purging fluid passage 42i is defined by the body 42 and fluidly connects a second outlet 46c of the purging valve 46 to the primary fuel passage 42d.

In the embodiment shown, the purging valve 46 has a first position in which fluid flow communication between the source of the purging fluid P and both of the primary and secondary passages 42d, 42e is limited by the purging valve 46, a second position in which the source of the purging fluid P is fluidly connected to the secondary passage 42e via the first purging fluid passage 42h and via the first outlet 46b of the purging valve 46, and a third position in which the source of the purging fluid P is fluidly connected to both of the primary and secondary passages 42d, 42e via the first and second outlets 46b, 46c of the purging valve 46 and via the first and second purging fluid passages 42h, 42i. The purging valve 46 may be operatively connected to a controller to selectively switch the valve between the first, second, and third positions. The purging valve 46 may be actuated by an actuator, which may be a solenoid, a pneumatic actuator, a hydraulic actuator or any other suitable actuator. A user, such as a pilot of an aircraft equipped with the engine 10, may trigger the purging of one or more of the passages 42d, 42e by powering the actuator using, for instance, a switch in a cockpit of the aircraft. In some embodiments, the purging may be triggered by engine logic within the full authority digital engine control (FADEC) of the engine. In some embodiments, the purging may be triggered hydro-mechanically when the fuel pressure reaches a certain threshold value. It will be appreciated that, in an alternate embodiment, in the second position of the purging valve 46, the source of the purging fluid P is fluidly connected to the primary fuel outlet 40b and disconnected from the secondary fuel outlet 40c.

In normal operation conditions of the engine 10, fuel is injected into the combustion chamber 16 via both of the first fuel outlet 40b and/or the second fuel outlet 40c of the injector 40 by having the flow divider valve 44 in the first position and the purging valve 46 in the first position. In low-power conditions, the fuel may be injected into the combustion chamber 16 solely via the first fuel outlet 40b by having the flow divider valve 44 in the second position and the purging valve 46 in the second position for purging the secondary passage 42e. Once the secondary passage 42e is substantially free of fuel, the purging valve 46 may be moved to the first position to limit the injection of the purging fluid while the flow divider valve 44 remains in the second position so that fuel is injected in to the combustion chamber 16 solely via the first outlet 40b. When the engine is shutting down, the flow divider valve 44 may be moved in the third position to limit the fuel from flowing from the fuel manifold 22 into the combustion chamber 16 and the purging valve 46 may be moved in the third position to inject the purging fluid into both of the primary and secondary fuel passages 42d, 42e to empty said passages from the fuel they contain. When the engine is shut down and the passages are substantially free of fuel, the purging valve 46 may be moved to the first position to limit injection of the purging fluid into the passages, and the flow divider valve 44 may remain in the third position to isolate the fuel manifold 22 from the combustor 16 thereby maintain the fuel manifold 22 substantially filled with fuel, hence the "wet" manifold. When purging occurs, the flow divider valve 44 is in the second or third positions while the purging valve 46 is in the second or third positions.

The purging valve 46 may be a pressure-based valve able to move from the first position to any of the second and third positions when a fuel pressure into the passages 42d, 42e becomes less than a threshold pressure. This threshold pressure may be selected based on a reference pressure, ambient atmospheric pressure or may be a function of the difference between the accumulated air pressure source. This threshold pressure may be approximately 0 gauge pressure. The fuel pressure into the primary and secondary passages 42d, 42e may decrease when the flow divider valve 44 is operated to disconnect the secondary passage 42e or both of the primary and secondary passages 42d, 42e from the manifold 22. The purging valve 46 may alternatively be an electro-mechanical valve having a solenoid engaged to a valve member. The electro-mechanical valve may be powered thereby actuating the solenoid to move the valve member such as to move the valve from the first position to the second or third positions. Any suitable valve may be used. It will be appreciated that one or more check valve(s) may be used to ensure that no fuel flows out of the fuel injector 40 via the first or second purging fluid passages 42h, 42i when no purging fluid is injected.

In alternate embodiment, the purging valve 46 may be fluidly connected to the flow divider valve 44 via a purging fluid passage 42j, which is shown in tiered line in FIG. 4. The flow divider valve 44 may be able to selectively control the injection of air or fuel into the fuel passages 42d, 42e.

Figure 5:
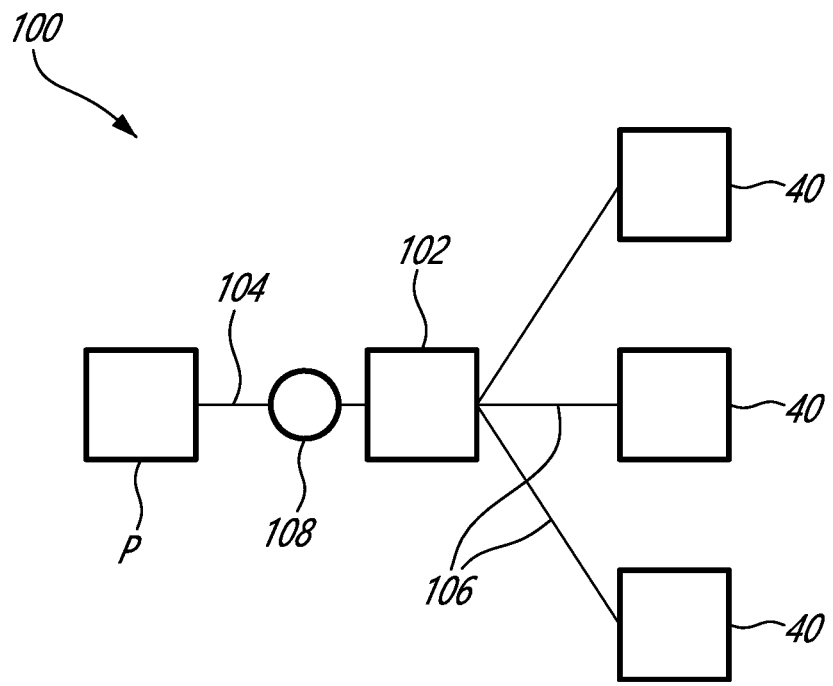
FIG. 5 is a more detailed schematic view of the purging system of FIG. 3.

Referring now to FIG. 5, the purging system 100 is shown in greater detail. In the embodiment shown, the source of the pressurized fluid P is fluidly connected to a manifold 102 via a fluid line 104, and, the manifold 102 has a plurality of outlets each fluidly connected to a respective one of the injectors 40 of the engine 10 via a respective fluid line 106. It will be appreciated that the fluid lines 102, 104 may be kept under pressure at all time. That is, only the purging valves 46 of the injector 40 may have to be moved to their second or third positions for the purging fluid to flow. A main valve 108 may be fluidly connected on the fluid line 104 that connects the source of the purging fluid P to the manifold 102. The main valve 108 may have two positions depending on whether or not the purging fluid is to flow toward the injectors 40.

The manifold 102 for the purging fluid may be integrated with the fuel manifold 22 (FIG. 2). In such a case, an extra manifold loop may be added to the existing fuel manifold 22. The source of the purging fluid P can be supplied by a higher pressure air source. For instance, bleed air at P3, P2.7 locations from the compressor section 14 of the engine 10 may be used to feed a pressurized vessel, the pressurized vessel may be used for injecting the purging fluid. The bleed air at P3 or P2.7 may be taken directly from another engine for purging. Alternatively, pressurized air from an electric pump, or a pressure vessel R may be used.

Figure 6:
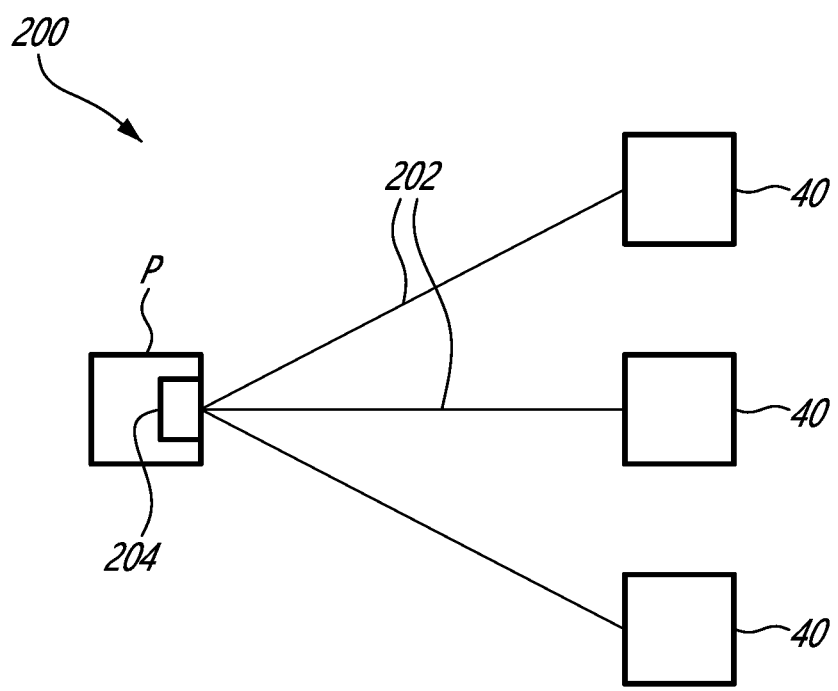
FIG. 6 is a schematic view of a purging system in accordance with yet another embodiment.

Referring now to FIG. 6, a purging system in accordance with another embodiment is shown at 200. In the embodiment shown, each of the injectors 40 is fluidly connected directly to the source of the purging fluid P via a respective fluid line 202. It will be appreciated that the fluid lines 202 may be kept under pressure at all time. That is, only the purging valves 46 of the injector 40 have to be moved to their second/third positions for the purging fluid to flow. A main valve 204 may be fluidly connected to the source of the purging fluid P. The main valve 204 may have two positions depending on whether or not the purging fluid is to flow toward the injectors 40.

Referring to all figures, for purging the fuel injectors 40 of the gas turbine engine 10, one or more of the primary and secondary fuel passages 42d, 42e are selectively fluidly disconnected from the fuel manifold 22; and the one or more of the primary and secondary fuel passages 42d, 42e is purging by injecting the purging fluid into the one or more of the primary and secondary fuel passages 42d, 42e while bypassing the fuel manifold 22.

In the embodiment shown, the selectively fluid disconnecting the one or more of the primary and secondary fuel passages 42d, 42e from the fuel manifold 22 includes moving the flow divider valves 44 of the fuel injectors 40 from a first position in which the fuel manifold 22 is fluidly connected to both of the primary and secondary fuel passages 42d, 42e to a second position in which the fuel manifold 22 is disconnected from the one or more of the primary and secondary fuel passages 42d, 42e.

The purging of the one or more of the primary and secondary fuel passages 42d, 42e may include flowing the purging fluid into the one or more of the primary and secondary fuel passages 42d, 42e downstream of the flow divider valves 44. The purging of the one or more of the primary and secondary fuel passages 42d, 42e may include moving the purging valves 46 of the fuel injectors 40 from a first purging valve position in which fluid communication between the source of the purging fluid P and the one or more of the primary and secondary fuel passages 42d, 42e is limited to a second purging valve position in which the source of the purging fluid P is fluidly connected to the one or more of the primary and secondary fuel passages 42d, 42e.

The moving of the purging valves 46 may include moving the purging valves 46 from the first purging valve position to the second purging valve position when a fuel pressure into the one or more of the primary and secondary fuel passages 42d, 42e becomes less than a threshold pressure. Alternatively, the purging valves 46 may be electro-mechanical valves and the moving of the purging valves 46 includes powering the electro-mechanical valves to move the purging valves 46 from the first purging valve position to the second purging valve position.

In some cases, the purging of the one or more of the primary and secondary fuel passages 42d, 42e includes purging both of the primary and secondary fuel passages 42d, 42e.

The injecting of the purging fluid may include injecting compressed air. The injecting of the compressed air may include drawing air from the compressor section 14 of the gas turbine engine 10 and injecting the drawn compressed air to the fuel injectors 40. In some cases, the drawn compressed air comes from another engine. In some cases, the drawn compressed air is stored in a pressurized vessel and the pressurized vessel is fluidly connected to the primary and/or secondary passages 42d, 42e when purging is required. In some cases, the injecting of the compressed air includes injecting the compressed air from the pressurized reservoir R.

As illustrated in FIG. 5, the injecting of the purging fluid includes flowing the purging fluid into the purging fluid manifold 102 and the purging fluid is injected from the purging fluid manifold 102 to the fuel injectors 40. As shown in FIG. 6, the injecting of the purging fluid includes fluidly connecting independently each of the fuel injectors 40 to the source of the purging fluid P via respective fluid lines 202.

It will be appreciated that all of the purging valves 46 of the fuel injectors 40 may be drivingly engaged to a single actuator secured to a casing of the gas turbine engine 10. The single actuator may be engaged to each of the purging valves 46 via suitable transmission means such that the powering of the single actuator simultaneously moves all of the purging valves 46 from their first to their second positions to inject the purging fluid. Alternatively, each of the purging valves 46 may be individually controlled, either by having each of the purging valves 46 being pressure-based or by having each of the purging valves being electro-mechanical valve.

Keeping the fuel manifold filled with fuel (i.e., a wet manifold) may reduce operability issues associated with filling and maintaining fuel flow through cavities of the fuel manifold. Traditional methods of forward purging a fuel system involve expelling fuel from the entire manifold, whereas in the case of the present disclosure, only the fluid volume within the nozzle tip may need to be cleared. This may result in a reduction in the volume of pressurized air required to effectively purge the manifold, a reduction in the amount of fuel that is wasted by forward purging, and reduced time required to fill the manifold. Reducing manifold fill times may be an important factor in successful altitude re-lights and reducing torching on start. In some cases, regulations may prevent the engine from forward purging unburnt fuel into the combustor. Because of the "wet manifold" status of the present disclosure, it may satisfy and/or be exempt from these fuel venting requirements. Compared to reverse-purging ecology-type fuel manifold purging mechanisms, the proposed disclosure may be more efficient at expelling residual fuel within the nozzle where it would be prone to nozzle coke buildup. The forward purging of the nozzles on shutdown may reduce the soak-back temperatures of the nozzles, further reducing nozzle coking.

The purging fluid, which may be air, may be used to purge only the fuel passages of the nozzle portion 42b of the body 42 of the injector 40. Alternatively, the fuel passages of both of the main and nozzle portions 42a, 42b of the body 42 of the fuel injector 40 may be purged. The source of the purging fluid P may be integrated into the manifold or come from an external supply.

In some embodiments, more than one fuel manifolds are present and the principles of the present disclosure may be used to purge a selected one of the primary and secondary fuel passages of the fuel injectors by bypassing an associated one of the more than one fuel manifolds. In such a case, each of the primary and secondary fuel passages may be connected to a respective one of two fuel manifolds. Valves may be used to selectively allow fuel to flow from the two fuel manifolds to their associated fuel passages.

Actuation of the purging system can be accomplished by hydro-mechanical, pneumatic or electronic means. The valves can either be actuated independently or in unison. The pressurized air source can be used to purge the secondary's while the engine is in a low-power, primary-only operating state, and can also be used during engine shutdown to purge both nozzle tips. Air can be accumulated within the outer manifold drain assembly, serving as both the fuel manifold drain and purge-air accumulator. Dual sealing requirements may sometimes be imposed on fuel manifold fittings. Having the purge air manifold encase the fuel manifold may serve as both a vessel to store high pressure air intended for purging, and it may also become a secondary sealing feature for the fuel connectors.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of purging fuel injectors of a gas turbine engine, the fuel injectors fluidly connected to a fuel manifold, a fuel injector of the fuel injectors having a primary fuel passage and a secondary fuel passage, the primary fuel passage and the secondary fuel passage fluidly connectable to the fuel manifold via a fuel line connected to a fuel inlet defined by a body of the fuel injector, each of the primary and secondary fuel passages having a respective inlet at the fuel line and a respective outlet at an outer surface of the body of the fuel injector, the method comprising:
    selectively fluidly disconnecting one or more of the primary and secondary fuel passages from the fuel manifold; and
    purging the one or more of the primary and secondary fuel passages by injecting a purging fluid into the one or more of the primary and secondary fuel passages independently of the fuel manifold while bypassing the fuel line and via a purging inlet defined by the body of the fuel injector, the purging inlet distinct from the fuel inlet.

2. The method of claim 1, wherein the selectively fluid disconnecting the one or more of the primary and secondary fuel passages from the fuel manifold includes moving a flow divider valve located within the body of the fuel injector from a first position in which the fuel manifold is fluidly connected to both of the primary and secondary fuel passages to a second position in which the fuel manifold is disconnected from the one or more of the primary and secondary fuel passages.

3. The method of claim 2, wherein the purging of the one or more of the primary and secondary fuel passages includes flowing the purging fluid into the one or more of the primary and secondary fuel passages downstream of the flow divider valves.

4. The method of claim 1, wherein the purging of the one or more of the primary and secondary fuel passages includes moving a purging valve of the fuel injector from a first purging valve position in which fluid communication between a source of the purging fluid and the one or more of the primary and secondary fuel passages is limited to a second purging valve position in which the source of the purging fluid is fluidly connected to the one or more of the primary and secondary fuel passages.

5. The method of claim 4, wherein the moving of the purging valves includes moving the purging valves from the first purging valve position to the second purging valve position when a fuel pressure into the one or more of the primary and secondary fuel passages becomes less than a threshold pressure.

6. The method of claim 4, wherein the purging valves are electro-mechanical valves, the moving of the purging valves includes powering the electro-mechanical valves to move the purging valves from the first purging valve position to the second purging valve position.

7. The method of claim 1, wherein the purging of the one or more of the primary and secondary fuel passages includes purging both of the primary and secondary fuel passages.

8. The method of claim 1, wherein the injecting of the purging fluid includes injecting compressed air.

9. The method of claim 8, wherein the injecting of the compressed air includes drawing the compressed air from a compressor section of the gas turbine engine and injecting the drawn compressed air to the fuel injectors.

10. The method of claim 8, wherein the injecting of the compressed air includes injecting the compressed air from a pressurized reservoir.

11. The method of claim 1, wherein the injecting of the purging fluid includes flowing the purging fluid into a purging fluid manifold extending around a central axis of the gas turbine engine and injecting the purging fluid from the purging fluid manifold to the fuel injectors.

12. The method of claim 1, wherein the injecting of the purging fluid includes fluidly connecting independently each of the fuel injectors to a source of the purging fluid via respective fluid lines.

* * * * *